(12) United States Patent
Bikkula et al.

(10) Patent No.: US 9,769,159 B2
(45) Date of Patent: Sep. 19, 2017

(54) COOKIE OPTIMIZATION

(71) Applicant: Microsoft Corporation, Redmond, WA (US)

(72) Inventors: Ravi Bikkula, Sammamish, WA (US); Michael Beyer, Kirkland, WA (US); Karuna Koneru, Redmond, WA (US); Jeffrey Goldian, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 13/716,072

(22) Filed: Dec. 14, 2012

(65) Prior Publication Data
US 2014/0173693 A1    Jun. 19, 2014

(51) Int. Cl.
*G06F 21/00* (2013.01)
*H04L 29/06* (2006.01)
*H04L 29/08* (2006.01)

(52) U.S. Cl.
CPC ...... *H04L 63/0853* (2013.01); *H04L 63/0807* (2013.01); *H04L 63/0815* (2013.01); *H04L 67/02* (2013.01)

(58) Field of Classification Search
CPC ............ H04L 163/0815; H04L 9/3213; H04L 63/0853; H04L 63/0815; H04L 63/0807; H04L 67/02; G06F 21/31; H04W 12/06
See application file for complete search history.

(56) References Cited

U.S. PATENT DOCUMENTS

| | | | |
|---|---|---|---|
| 7,137,006 B1 | 11/2006 | Grandcolas | |
| 2007/0118890 A1* | 5/2007 | Song | 726/8 |
| 2008/0134295 A1* | 6/2008 | Bailey et al. | 726/4 |
| 2009/0300744 A1* | 12/2009 | Guo et al. | 726/7 |
| 2012/0011578 A1 | 1/2012 | Hinton | |
| 2012/0110318 A1* | 5/2012 | Stone | H04L 9/3234 713/150 |
| 2012/0260322 A1 | 10/2012 | Logan | |

(Continued)

OTHER PUBLICATIONS

How Single Sign-On Works in Office 365, http://community.office365.com/en-us/wikis/sso/727.aspx, Oct. 26, 2012, 3 pages.

(Continued)

*Primary Examiner* — Kendall Dolly
(74) *Attorney, Agent, or Firm* — Davin Chin; Chin IP, PLLC

(57) ABSTRACT

Disclosed herein is a system and method for optimizing a cookie or token in a web service or other claims based domain system. A user presents an identity token to the domain system which verifies the identity claim as authentic and then determines what accounts the user has access to on the domain. The user is issued an intermediate token by the system which includes the locations of the accounts the user has access to. The user then selects the account they wish to interact with and receives an account token back to the user for the specific account, including any of the privileges the user has on the account. The account token also includes information that the user has multiple accounts on the domain. The user is able to switch accounts on the domain system without having to revalidate their credentials to the domain system.

20 Claims, 5 Drawing Sheets

(56) References Cited

U.S. PATENT DOCUMENTS

2013/0268999 A1* 10/2013 Kiang et al. ..................... 726/4

OTHER PUBLICATIONS

One-Time Cookies: Preventing Session Hijacking Attacks with Stateless Authentication Tokens, Italo Dacosta et al, ACM Transactions on Internet Technology, http://smartech.gatech.edu/jspui/bitstream/1853/42609/1/GT-CC-12-02.pdf, Jun. 2012, 31 pages.
Appendix B—Authenticating Users and Authorizing Requests, http://msdn.microsoft.com/en-us/library/hh868049.aspx, Oct. 26, 2012, 14 pages.
Ten Steps to Achieve Single Sign-On (SSO) & Federated Identity Management (FIM), http://www.seros.com/whitepapers/Seros-SecurityIAM-TenSteps.pdf, Jan. 2010.

* cited by examiner

COOKIE OPTIMIZATION

TECHNICAL FIELD

This description relates generally to generation of account tokens or cookies for cloud based applications where a user has access to a large number of accounts on a domain.

BACKGROUND

Claims based authentication and authorization is a standard approach to managing a user's privileges on components of a system. In short, a trusted party creates and signs a set of privileges, commonly referred to as a token, which other components can trust after validating the signature. In the case of a web page, using cookies to store such claims provides a simple way of transmitting the claim base authentication and authorization between calls and pages in web based applications. However, by using cookies certain restrictions on the size of the claim are imposed. Cookies cannot be larger than 4 kilobytes. Further for any given domain a user is limited to a maximum of 20 cookies. If the user exceeds this number of cookies then no more cookies can be provided for the user. In a web based applications such as web service, a user may be associated with a large number of accounts, and thus have large numbers of privileges to those accounts. This results in keeping the user's claim to a the limited size is extremely difficult.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for optimizing a cookie or token in a web service or other claims based domain system. The system uses an identity service to verify the identity of the user and determine the domain the user is authorized to communicate with. The user presents this identity token to the domain system which verifies the identity claim as authentic and then determines what accounts the user has access to on the domain. The user is issued an intermediate token by the system which includes, at least the locations of the accounts the user has access to. The user then selects the account they wish to interact with through a dashboard. Following this selection the system receives this indication and issues an account token back to the user for the specific account, including any of the privileges the user has on the account. The account token also includes information that the user has multiple accounts on the domain. The user can switch accounts by interacting with the interface. This interaction causes the account token to be converted back to the intermediate token by the system and causes the user to once again see the list of accounts on the dashboard.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
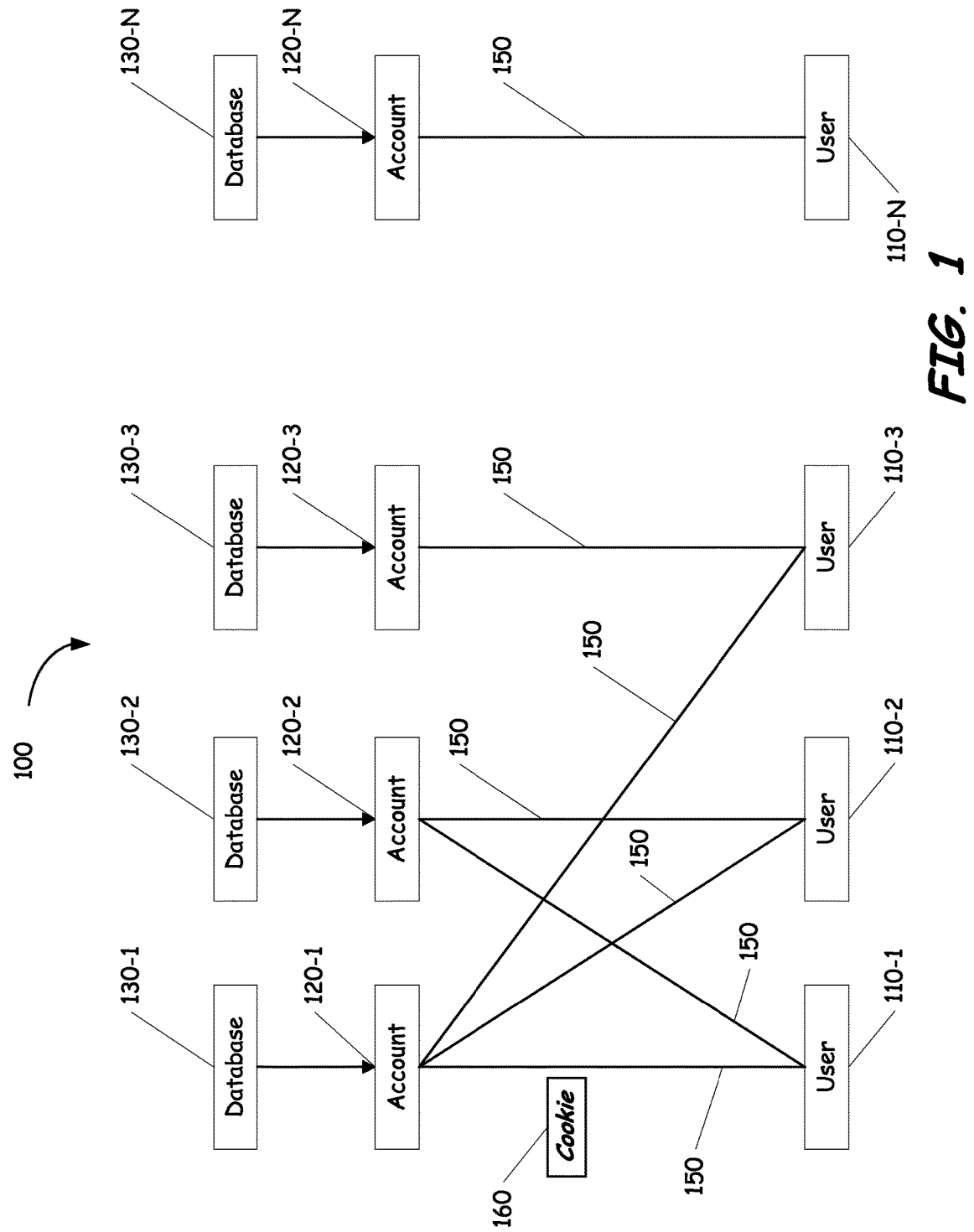
FIG. 1 is a block diagram illustrating a relationship between multiple users and multiple accounts that are distributed across many different platforms within a web service according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a block diagram illustrating a relationship between multiple users and multiple accounts that are distributed across many different platforms within a web service 100 or other domain system. Illustrated in FIG. 1 are a plurality of users 110-1, 110-2, 110-3, and 110-N, a plurality of accounts 120-1, 120-2, 120-3 and 120-N, and a plurality of data stores 130-1, 130-2, 130-3 and 130-N associated with the plurality of accounts 120-1, 120-2, 120-3 and 120-N. Each of the accounts 120-1, 120-2, 120-3 and 120-N, data stores 130-1, 130-2, 130-3 and 130-N, and users interact with each other through the use of one or more computers and computer hardware and may be connected with each other through various network connections.

The plurality of accounts 120-1, 120-2, 120-3 and 120-N are representative of any activity that is performed by the user that accesses the data that is associated with that particular account. These accounts can all be members of the same domain, such as a corporate domain, an online service that is providing the domain, or can be across multiple domains. Activities associated with accounts 120-1, 120-2, 120-3 and 120-N can for example, include applications that access the data, the application itself, or any other process that access or manipulate the data associated with the account. For example, an account may be an employee account. This account would have data associated with it related to the specifics of an employee, such as name, date of birth, address, dependents, etc. Another account may include data associated with compensation or reviews for employees. A third account may be a customer account that has data associated with various customers in an organization. Yet another account may be an account for a specific department of the company, or an inventory account. However, accounts can be any type of account or related to any type of data. These accounts 120-1, 120-2, 120-3 and 120-N are typically accessed by various different users where each user may have different levels of access to the data in the associated data store depending on a specific role of the user.

Data stores 130-1, 130-2, 130-3 and 130-N can be any type of data structure, such as databases, SQL database, data blobs, structured or unstructured data. Data stores 130-1, 130-2, 130-3 and 130-N can be stored on any type of storage media. In some embodiments data stores 130-1, 130-2, 130-3 and 130-N are stored on multiple storage devices. In other embodiments a single data store may be stored on multiple storage devices in whole or in part such that the data in the data store is accessible to multiple users.

In the embodiment illustrated in FIG. 1 users 110-1, 110-2, 110-3, and 110-N have different levels of access to the accounts 120-1, 120-2, 120-3 and 120-N. Some users may have a single role or level of access on the account, such as user, administrator or auditor, while other users may have multiple roles on the account, such as both a user and administrator. For example, if one account is an employee account, a person from human resources may have the ability to view data for all employees. While an employee can only view and manipulate their own data in the account. Thus, a user from human resources could have two different roles in the system, the human resources role and the employee role. The connection between users and accounts are illustrated by lines 150. Each line 150 represents a different role or level of access on a specific account. For each role or level of access that a user has on the account a separate cookie 160 is generated and provided to the user. (for purposes of clarity of the figure only one cookie 160 is illustrated.) This cookie 160 provides information about the account and the user's ability to access resources on the account. However, cookies are limited in both form and function. Specifically, cookies are limited to 4 KB in size. Further, a user is limited to only 20 cookies on a single domain. This poses a problem as many organizations move to web/cloud based applications that are all within one domain, or when the user has access to many different accounts in the domain with multiple roles or levels of access on many of the accounts. In order to deal with the limitations of the cookies in system 100 makes use of the cookie optimization system 200.

Figure 2:
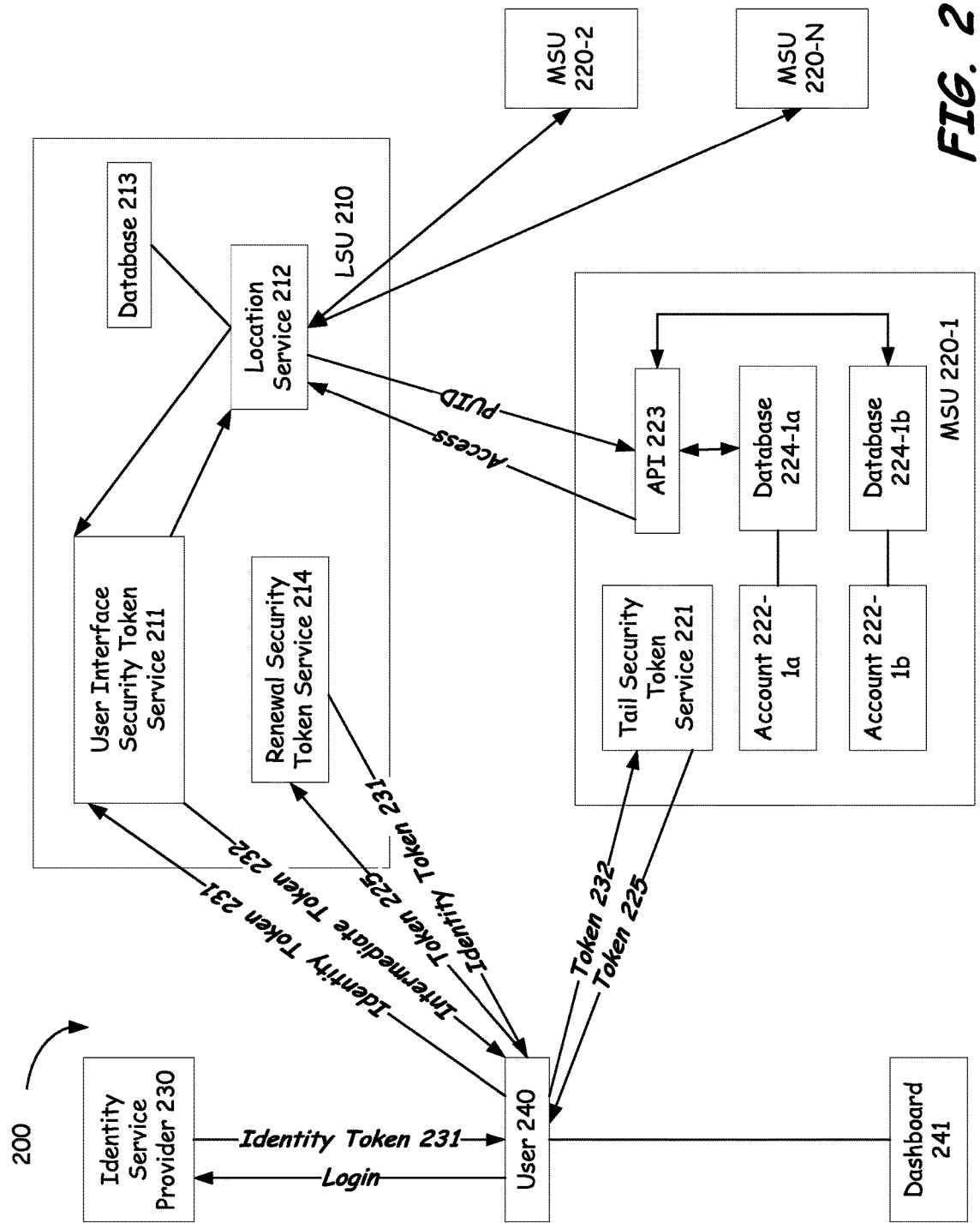
FIG. 2 is a block diagram illustrating a cookie optimization system in a web based service according to one illustrative embodiment.

FIG. 2 is a block diagram illustrating a cookie optimization system 200 in a web based service according to one illustrative embodiment. System 200 includes a login scale unit 210 (LSU), a number of management scale units 220-1, 220-2, 220-N, (referred to herein as MSU 220), an identity service 230, and at least one user 240 on domain 250 who interacts with system 200.

Identity service 230 is an identity provider service that allows the user 240 to verify to the system 200 who they are. In one embodiment the identity service 230 is a component external from the user's domain 250. This would be an identity service 230 such as LiveID, Facebook, Google, or any other identity service provider that allows a user to login to the service and receive a unique identifier. In another embodiment the identity service 230 is contained within the domain 250 and is unique to that domain. The identity service 230 provides to the user 240 in response to the login a unique identifier for the user and an associated domain for the user. This is provided back to the user through identity token 231.

LSU 210 is a component of system 200 that is configured to receive the token 231 from the user 240 and determine what accounts and MSUs 220 the user may have access to in domain 250. The LSU 210 includes a user interface security token service 211, a location service 212, a database 213 and a renewal security token service 214.

User interface security token service 211 is, in one embodiment, a web service that is responsible for validating token 231 that was created by the identity service 230 and is presented by the user to LSU 210. The user interface security token service 211 can use any method available for validating the token 231. Once the token 231 is validated the user interface security token service is configured to extract from the token 231 the domain 250 associated with the user 240. The user interface security token service 211 also receives from the location service 212 the listing of MSUs 220 that have accounts that the user has or may have access to. It combines all of this information into an intermediate token 232 that includes identity information (identity claim) for the user 240 as well as the list of accounts.

Location service 212 is an internal service of the LSU 210 that receives the domain information from the user interface security token service 211 and determines the accounts that user has or may have access to. The location service 212 contacts database 213 and requests from the database 213 a list of all accounts on the domain 250 as well as the location of the MSU 220 associated with the account. The location service 212 calls each of the indicated MSUs 220 and sends to the MSU 220 the unique identifier (PUID) that was extracted for the user 240, and waits for the MSUs 220 to respond with whether the user has access to the account or not. Once all of the indicated MSUs 220 have responded the location service provides this list of the locations of the corresponding MSUs 220 that indicated that the user has an account or accounts to the user interface security token service 211. In some embodiments, the list of accounts may be provided to the user interface security token service 211.

Database or data store 213 is a database/data store that stores a list of accounts that are available on the domain 250. The database 213 only keeps a list of accounts on the domain and does not manage or otherwise know whether a user has access to one, more than one or none of the accounts. Database 213 also holds the location of the MSU 220 that each account is located on. In some cases the Database 213 may have two locations for the same account. This would be indicative of the account either being distributed across multiple MSUs 220 or having two locations in order to provide improved performance or for other reasons.

Renewal security token service 214 is a web service that transforms a management claim back into the identity claim. The renewal security token service 214 receives from the user 240 the management claim that was previously issued by the appropriate MSU 220 in token 225, and an indication that the user desires to change the account they are currently accessing. The renewal security token service 214 transforms the management claim into an identity claim by removing the management information from the claim and returns only the identifying information to the user as token 231. The user is then presented a dashboard 241 where they can select a new account to interact with.

MSUs 220 are a component of system 200 that is configured to manage the data that is associated with an account such as accounts 120-1, 120-2, 120-3, and 120-N as well as to ensure that persons who are entitled to access the account are able to access the account with the appropriate levels of access. Each MSU 220 includes a tail security token service 221, at least one account 222, an API 223 and a database 224. For purposes of this discussion account 222 represents any one of the accounts 120-1, 120-2, 120-3, and 120-N illustrated and discussed with regards to FIG. 1.

The MSU 220 receives requests from the LSU 210 to determine if the user 240 has access to an account 222 located on the MSU 220 during the pre-account selection stage of the cookie optimization system. This request is received at API 223 which is configured to enable the determination of access on the account 222 by querying the access control portion of the account's database. Through API 223, database 224 is queried to determine if the user 240 has access to the account. If the user 240 has access to account 222 on MSU 220, through API 223 an indication is returned to LSU 210 that the user has access to that account or an account on that particular MSU 220. If the user 240 does not have access to the account 222 then an indication that the user 240 does not have access to the account is returned through the API 223.

MSU 220 also includes the tail security token service 221. The tail security token service 221 is a web service that transforms a received identity claim contained within token 232 from user 240 into a management claim for the specific account 222. The management claim contains all of the information needed to interact with account 222. For example, the management claim includes information specific to the account, URLs to interact with the account, and the role of the user 240 on the account. Further, in addition to the information needed to interact with the account 222, the management claim also includes the identifying information that was present in the identity claim and information as to whether the user has multiple accounts on domain 250. This management claim is packaged into account token 225 and returned to the user 240. Once the user has the management claim they are able to interact with the account 222 in a normal manner. However, in some embodiments the function of the tail security token service 221 is performed by the user interface security token service 211 or the renewal token security service 214 of the LSU 210.

User 240 interacts with the cookie optimization system 200 through a dashboard 241. Dashboard 241 is in one embodiment a web page that displays information to user 240 regarding the accounts they have access to use on the domain and permits the user 240 to select and interact with the account in a normal interaction. When the user 240 first interacts with the dashboard 241 they are directed to the identity service 230 where they can input their login credentials. In other embodiments, the user 240 has already interacted with the identity service 230 to obtain their login credentials through the normal interface of identity service 230. This interaction with the identity service 230 occurs only one time while the user is engaging or interaction with the system 200. However, the user may have to interact with the identity service 230 again following certain events, such as termination of the session, logging out of the system, or accessing the system 200 from another computer. Once the login credentials have been validated by the identity service 230 and the list of accounts has been determined by the LSU 210 the dashboard 241 then refreshes its image to provide the user with the ability to select the account they wish to interact with. This interaction is in a format that is typically used for selections by users, such as through a drop down menu, a check box, a selection screen, etc.

Figure 3:
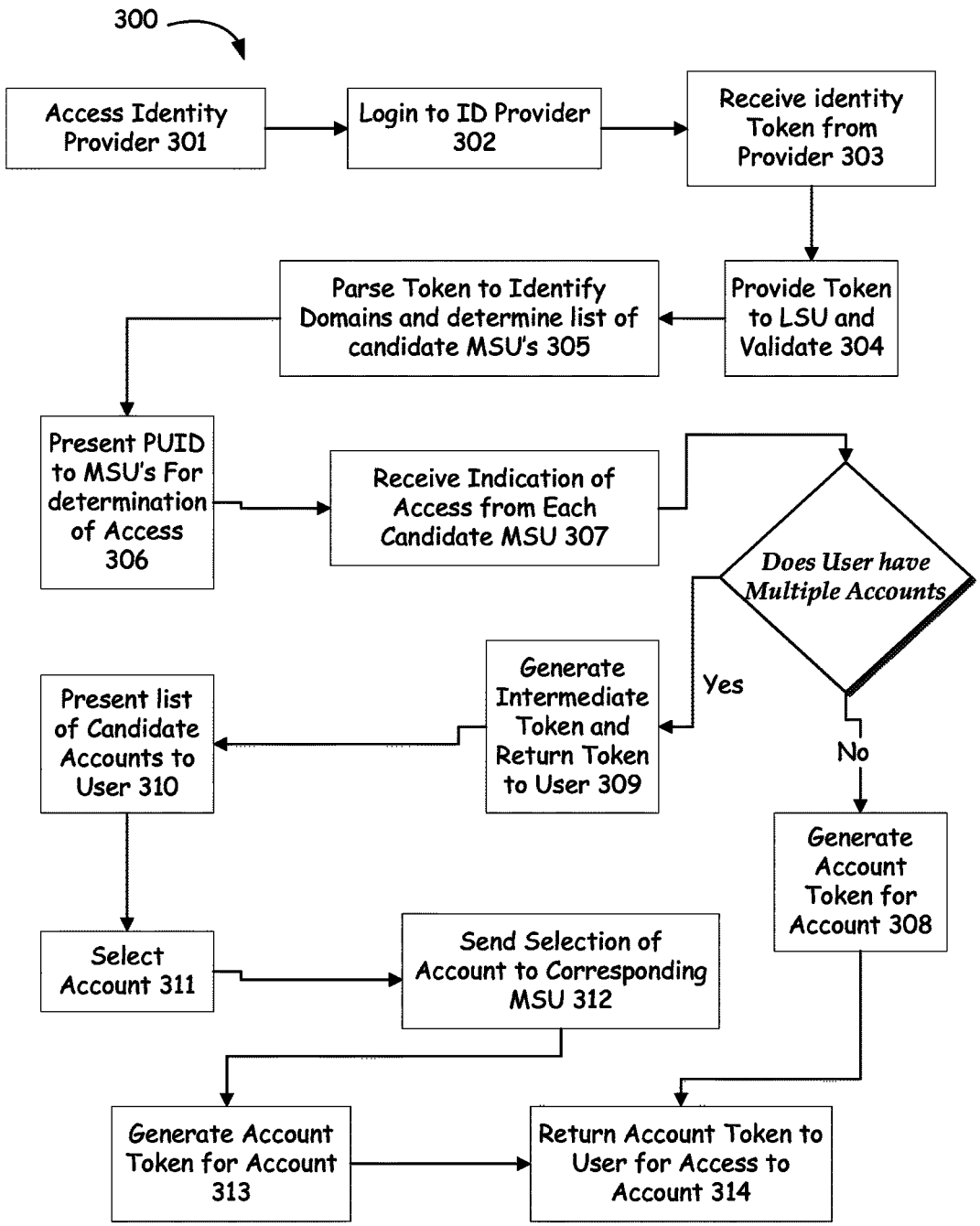
FIG. 3 is a flow diagram illustrating the process of using the cookie optimization system to generate the account token according to one illustrative embodiment.

FIG. 3 is a flow diagram illustrating the process of using the cookie optimization system 200 to generate the account token according to one illustrative embodiment of the present disclosure.

Process 300 begins when a user such as user 240 logs into an identity service such as identity service 230 using, for example, a web browser. The user connects to the identity service 230 through a network connection. As mentioned above this identity service 230 can be any provider or service that permits the user to obtain a single sign on token/certificate from the identity service 230. The connection to the identity service 230 is recognized and the connection to the identity service is completed. This is illustrated at step 301.

Once the user 240 has accessed the identity service 230 the user 240 is prompted by identity service to enter in a user name and an associated password for that particular user 240. The user provides this login information to the identity service 230. The identity service 230 then proceeds to process this login information to determine if the user 240 is in fact an authorized user of the identity service 230. This is illustrated at step 302.

Once verified by the identity service 230 at step 302, the identity service 230 then prepares an identity token 231 for the user 240 that is to be sent back to the user for later presentment. This identity token 231 includes at least personally unique ID (PUID) for the user on the identity service 230 and an associated domain 250 for the user. In some embodiments the identity service 230 may recognize that the user 240 is registered on multiple domains. In this case the identity service 230 may provide a user interface back to the user 240 for the user to select the domain 250 that they are desire to join. Once the user 240 has selected the domain 250 that they wish to join the identity service 230 proceeds to generate the appropriate identity token 231 for the user. Once the token 231 is prepared the identity service 230 sends the identity token to the user. This is illustrated at step 303.

Once the user 240 has received the token 231 from the identity service the user then connects with the appropriate domain that they desire. This is accomplished by interfacing with the login scale unit 210 that is used by the domain 250 that the user desires to access. The user 240 provides the token 231 received from the identity service 230 to the LSU 210 which then interfaces with the user interface security token service 211. The user interface security token service 211 validates the provided token to verify that the claims presented in the token are valid. This is illustrated at step 304.

Once the token has been validated by the user interface security token service 211, the token is then parsed to extract from the token the domain of the user 240 and the PUID. The domain information is passed to the location service 212 of the LSU 210. The location service 212 then accesses its backend database 213 of domains that are supported on the system and identifies that domain. Also at this time the location service 212 uses the database 213 to determine all the possible accounts 222 that this particular user 240 may have access to on the domain 250. The location service 212 does not know which of the accounts the user has access to or what the user's level of permissions on these particular accounts is. At this step, the location service 212 is obtaining the list of candidate accounts. Also returned with each account is the location of the MSU 220 where the account service is currently located. This is illustrated at step 305.

Once the list of candidate accounts for the user on the domain 250 is determined and the associated MSU's 220 for the accounts have been identified, the PUID for the user is presented to each of the candidate accounts on each of the MSUs 220. This is illustrated at step 306.

At each of the accounts 222 the PUID is compared against a list of authorized users for the account. If the user's PUID is determined to be authorized for the account the account returns an indication that the user has access to the account. If the user's PUID is determined not to be authorized for the account then an indication that the user does not have access to the account is returned. In some embodiments, the user's level of access is also returned at this step. In other embodiments it is simply the access/no access determination that is returned to the LSU 210. The determination of access is illustrated at step 307.

The location service 212 receives from each of the candidate accounts the access/no access determination. If only one account returns that the user has access, the user interface token service 211 of the LSU 210 proceeds to generate a token for the user for this single account and returns this token to the user. This is illustrated at step 308. In some embodiments it may be possible from other information in the user's request to the service to determine the specific account that the user is attempting to access. In this situation, the user interface token service 211 can generate the token for the specific account without the need to have the user select the specific account that they desire.

If the location service 212 receives indications that the user has access to more than one account the user interface token service 211 proceeds to generate an intermediate token 232 for the user. The intermediate token 232 generated by the user interface token service 211 in LSU 210 includes a location identifier, such as a uniform resource locator "URL" for each of the MSUs 220 that the holds an account the user is permitted to access. In an alternative embodiment, the intermediate token may include a global unique ID for each of the accounts the user has access to as well as the MSU 220 that the specific account is located on. In some embodiments the intermediate token 232 includes the indication of the level of access the user has to the account. This intermediate token 232 is then returned to the user. This is illustrated at step 309.

The user receives the intermediate token 232 from the LSU 210 at their application portal. The application portal generates a dashboard 241 that includes a list of all of the accounts 222 the user has permission to access. In some embodiments the dashboard 241 uses the location information contained in the intermediate token 232 to query each of the indicated location to obtain the listing of accounts prior to the presentment of the accounts to the user. This dashboard 241 is a visual representation of the accounts 222. The presentment to the user 240 of the accounts 222 they have access to is illustrated at step 310.

The user 240 then reviews the list of accounts 222 and selects the account that they wish to access. This is illustrated at step 311.

Once the user 240 has made the selection of the account 222 they wish to access, the indication of this selection is sent to the tail security token service 221 of MSU 220 associated with the account. This is illustrated at step 312

The tail security token service 221 uses the indication of the selection of the account 222 to generate an account token 225 for the specific account 222 and user 240, including the appropriate management claims. This account token 225 also includes an indication in it that the user has multiple accounts on the domain. This is illustrated at step 313.

The user receives the account token 225 from the tail security token service 221 and then accesses the account using the location information of the account from the intermediate token 232 and the account token. The user is then able to interact with the account 222 as they would normally. This is illustrated at step 314.

Figure 4:
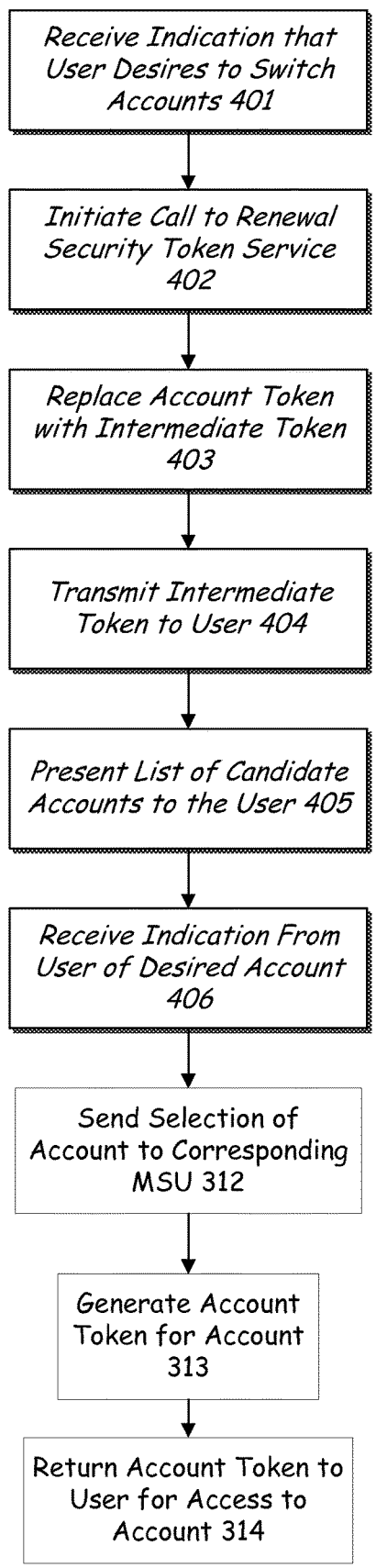
FIG. 4 is a flow diagram illustrating the process for renewing or switching accounts according to one embodiment.

FIG. 4 is a flow diagram illustrating the process that occurs when the user 240 decides to access a different one of the accounts 222 on the domain 250. The user 240 is currently in one of the accounts 222 that the user is permitted to access. Because the account token 225 that was issued when the user accessed this account indicated that the user has access to multiple accounts a link or other indication that the user has multiple accounts is displayed on dashboard 241. The user indicates the desire to change accounts by interacting with the displayed indication. This interaction can be, for example, clicking on a link or button, making a gesture on the display to indicate the desire to change accounts, or any other method for indicating the desire to switch accounts. This is illustrated at step 401.

Following the user's indication of the desire to switch accounts at step 401 a call from web service 100 is made to the renewal security token service 214 on the LSU 210 and the account token 225. This is illustrated at step 402.

The token 225 is returned to the renewal security token service 214 and once received by service 214 is replaced with the intermediate token 232 that was generated earlier in the process of FIG. 3. This is illustrated at step 403.

The user receives the intermediate token 232 back from the LSU 210 at step 404. This causes the user to again view the dashboard 241 that they saw previously when selecting the account 222. This is illustrated at step 405. The user again reviews the list of available accounts 222 and makes their indication of the account that they wish to interact with. This is illustrated at step 406. After the user makes the selection of the desired account, the process of switching accounts and receiving a new token proceeds according to the same process that is illustrated in steps 311-314 of FIG. 3.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 5:
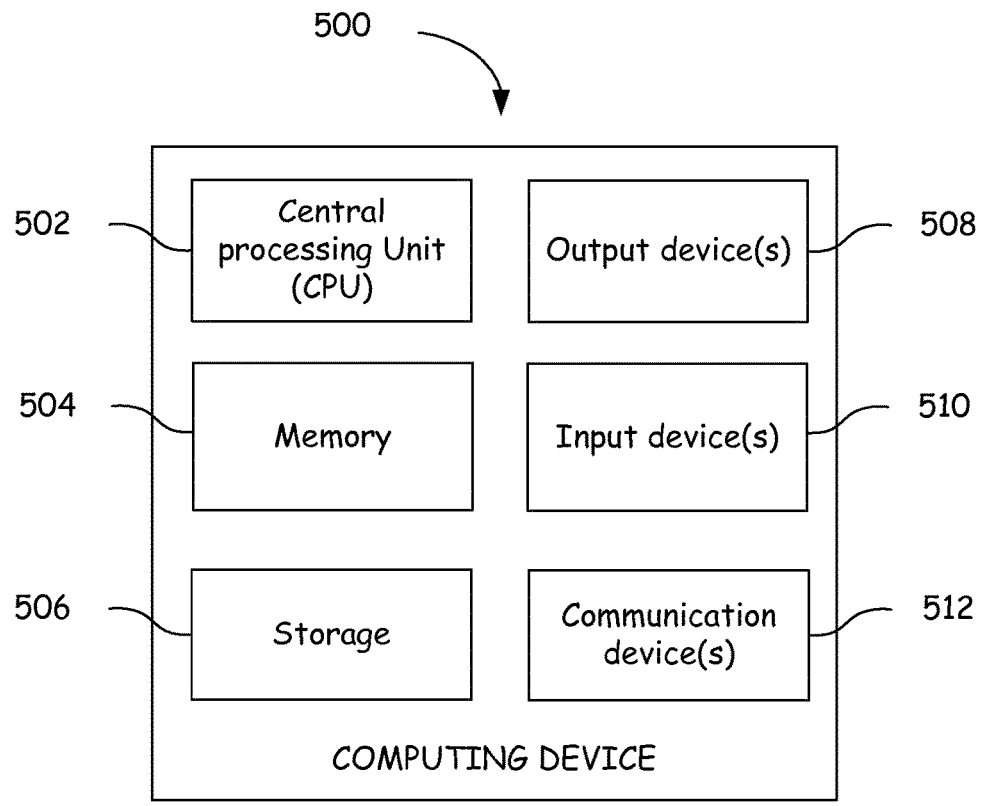
FIG. 5 is a block diagram illustrating a computing device which can implement the cookie optimization system according to one embodiment.

FIG. 5 illustrates a component diagram of a computing device according to one embodiment. The computing device 500 can be utilized to implement one or more computing devices, computer processes, or software modules described herein. In one example, the computing device 500 can be utilized to process calculations, execute instructions, receive and transmit digital signals. In another example, the computing device 500 can be utilized to process calculations, execute instructions, receive and transmit digital signals, receive and transmit search queries, and hypertext, compile computer code, as required by the system of the present embodiments. Further, computing device 500 can be a distributed computing device where components of computing device 500 are located on different computing devices that are connected to each other through network or other forms of connections. Additionally, computing device 500 can be a cloud based computing device.

The computing device 500 can be any general or special purpose computer now known or to become known capable of performing the steps and/or performing the functions described herein, either in software, hardware, firmware, or a combination thereof.

In its most basic configuration, computing device 500 typically includes at least one central processing unit (CPU) or processor 502 and memory 504. Depending on the exact configuration and type of computing device, memory 504 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 506. Computer storage media includes volatile and nonvolatile, removable and non-removable media implemented in any method or technology for storage of information such as computer readable instructions, data structures, program modules or other data. Memory 504 and storage 506 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 512 that allow the device to communicate with other devices. Communications device(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 510 such as keyboard, mouse, pen, voice input device, touch input device, etc. Output device(s) 508 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computing device comprising:
   at least one memory and at least one processor, wherein the at least one memory and the at least one processor are respectively configured to store and execute instructions including instructions for causing the computing device to perform operations, the operations including:
   receiving an identity token that is associated with a user;
   determining a list of candidate computing accounts for the user on a given computing domain based on information contained within the identity token;
   determining computing accounts, from the list of candidate computing accounts, that the user has access to and the user's permission level on each of the computing accounts from the list of candidate computing accounts that the user has access to;
   in response to determining the computing accounts, generating an intermediate token for the user, the intermediate token including an identity claim for the user and a list of computing accounts that the user was determined to have access to;
   generating an account token for an account selected from the list of computing accounts that the user was determined to have access to;
   providing the account token to another computing device; and
   in response to a request, authorizing a holder of the account token to access the account selected from the list of computing accounts that the user was determined to have access to.

2. The computing device of claim 1, wherein the operations further include:
   parsing the received identity claim for an identity of a computing domain.

3. The computing device of claim 2, wherein the to operations further include:
   parsing the received identity claim for a personally unique identifier for the user on the computing domain.

4. The computing device of claim 1, wherein the operations further include:
   determining a location of a service having information regarding a particular computing account to which the user may have access.

5. The computing device of claim 4, wherein the operations further include:
   querying the determined service with a personally unique identifier for the user; and
   receiving an indication of whether the user has access to a particular computing account.

6. The computing device of claim 1, wherein the operations further include:
   converting the account token for the user into the intermediate token for the user.

7. The computing device of claim 1, wherein the operations further include:
   receiving the intermediate token from the user; and
   converting the intermediate token into the account token.

8. The computing device of claim 1, wherein the account token includes a management claim 1, the management claim comprising identifying information uniquely identifying the user and an indication that the user has multiple accounts on the computing domain.

9. The computing device of claim 1, wherein the operations further include:
   receiving a user name and password from a user; and
   providing the identity token to a user in response to receiving the user name and the password.

10. A method comprising:
    receiving, by a computing device, an identity token for a user;
    extracting a domain identifier for at least one computing domain from the identity token, wherein the domain identifier is contained within a portion of the identity token;
    determining a list of locations of computing accounts that the user has permission to access based at least in part on the extracted domain identifier;
    generating an intermediate token for the user, the intermediate token indicating the determined list of locations of computing accounts;
    generating an account token for an account selected from the computing accounts that the user has permission to access;
    transmitting, by the computing device, the generated account token to another computing device, the generated account token including an indication that the user has multiple accounts; and
    authorizing a holder of the account token to access the account selected from the computing accounts that the user has permission to access.

11. The method of claim 10, further comprising:
    validating the received identity token; and
    extracting, by the computing device, a personally unique identifier for the user from the identity token.

12. The method of claim 10, wherein determining the list of computing accounts comprises:
    obtaining a list of candidate accounts for the user on the at least one computing domain;
    querying if the user is authorized to access a computing account from the list of candidate accounts; and
    if the user is authorized to access the computing account from the list of candidate accounts adding a location of that computing account to the determined list of locations of accounts.

13. The method of claim 12, wherein the querying comprises:
    comparing a personally unique identifier for the user against a list of authorized users on the computing account; and
    returning an indication that the user is authorized to access the computing account if the user is authorized.

14. The method of claim 13, wherein returning the indication further includes returning an indication of a level of access the user has to the computing account if the user is authorized to access the computing account.

15. The method of claim 10, further comprising:
    receiving an indication of a selection of a computing account from the computing accounts that the user has permission to access.

16. The method of claim 10, further comprising:
    receiving an indication a request to change to a different one of the computing accounts from the computing accounts that the user has permission to access;
    converting the account token into the intermediate token;
    receiving an indication of a new computing account from the computing accounts that the user has permission to access; and
    generating a new account token for the user, the new account token for accessing the new computing account.

17. The method of claim 10, wherein the computing account token includes a management claim for the selected computing account and an indication that the user has access to multiple computing accounts on the at least one computing domain.

18. A method, comprising:
receiving, by a computing device, an identity token that is associated with a user;
determining a list of candidate computing accounts for the user on a given computing domain based on information contained within the identity token;
determining computing accounts, from the list of candidate computing accounts, that the user has access to and the user's permission level on each of the computing accounts from the list of candidate computing accounts that the user has access to;
in response to determining the computing accounts, generating an intermediate token for the user, the intermediate token including an identity claim for the user and a list of computing accounts that the user was determined to have access to;
generating an account token for an account selected from the list of computing accounts that the user was determined to have access to;
providing the account token to another computing device; and
in response to a request, authorizing a holder of the account token to access the account selected from the list of computing accounts that the user was determined to have access to.

19. The method of claim 18, wherein further comprising:
determining a location of a service having information regarding a particular computing account to which the user may have access;
querying the determined service with a personally unique identifier for the user; and
receiving an indication of whether the user has access to a particular computing account.

20. The method of claim 18, wherein the account token includes a management claim, the management claim comprising identifying information uniquely identifying the user and an indication that the user has multiple accounts on the computing domain.

* * * * *